United States Patent [19]
Moore

[11] 4,130,135
[45] Dec. 19, 1978

[54] AUTOMATIC LIQUID FLOW CONTROL DEVICE

[76] Inventor: Donald D. Moore, 5716 Benton Ave. S., Minneapolis, Minn. 55436

[21] Appl. No.: 814,173

[22] Filed: Jul. 11, 1977

[51] Int. Cl.² ............................................. A01G 27/00
[52] U.S. Cl. .................................. 137/624.11; 239/70
[58] Field of Search ...................... 137/624.11, 624.12, 137/624.22; 222/70; 239/70; 418/69, 27; 415/18, 51; 73/253

[56] References Cited
U.S. PATENT DOCUMENTS

| 2,545,928 | 3/1951 | Martin | 137/624.22 X |
| 3,172,604 | 3/1965 | Brock | 239/70 |

*Primary Examiner*—Alan Cohan
*Attorney, Agent, or Firm*—Merchant, Gould, Smith, Edell, Welter & Schmidt

[57] ABSTRACT

An automatically actuated liquid flow control device or valve is provided for timed starting and/or stopping the flow of a liquid, e.g. water, through a supply line. The liquid flow control valve includes a paddle wheel or waterwheel and a timing mechanism. The automatic liquid flow control valve is particularly adapted for use in conjunction with lawn or garden watering systems.

6 Claims, 4 Drawing Figures

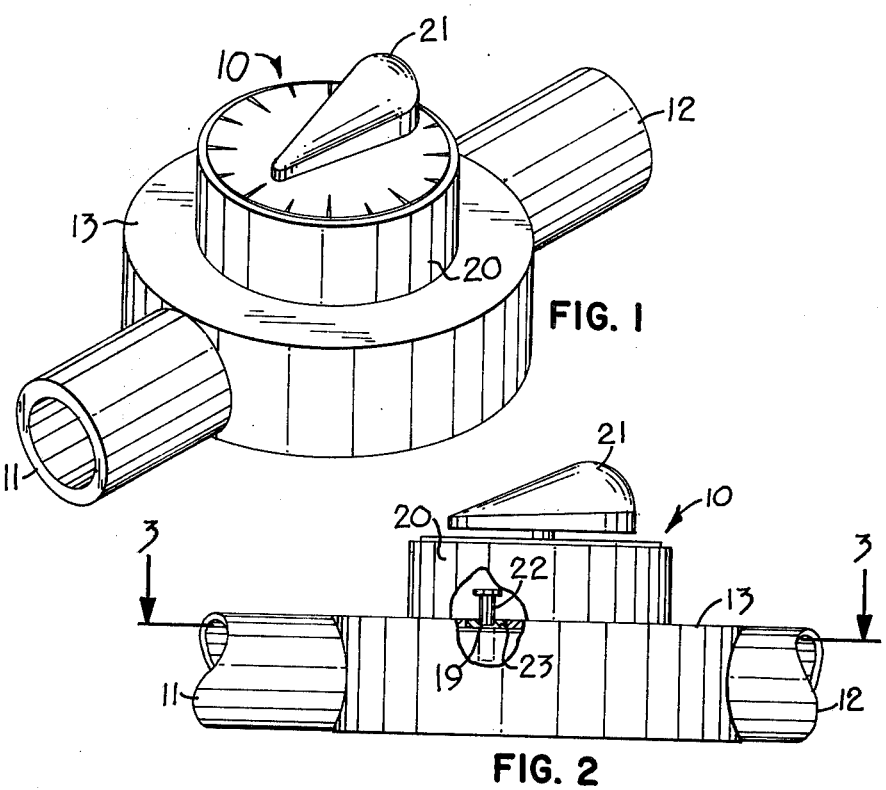
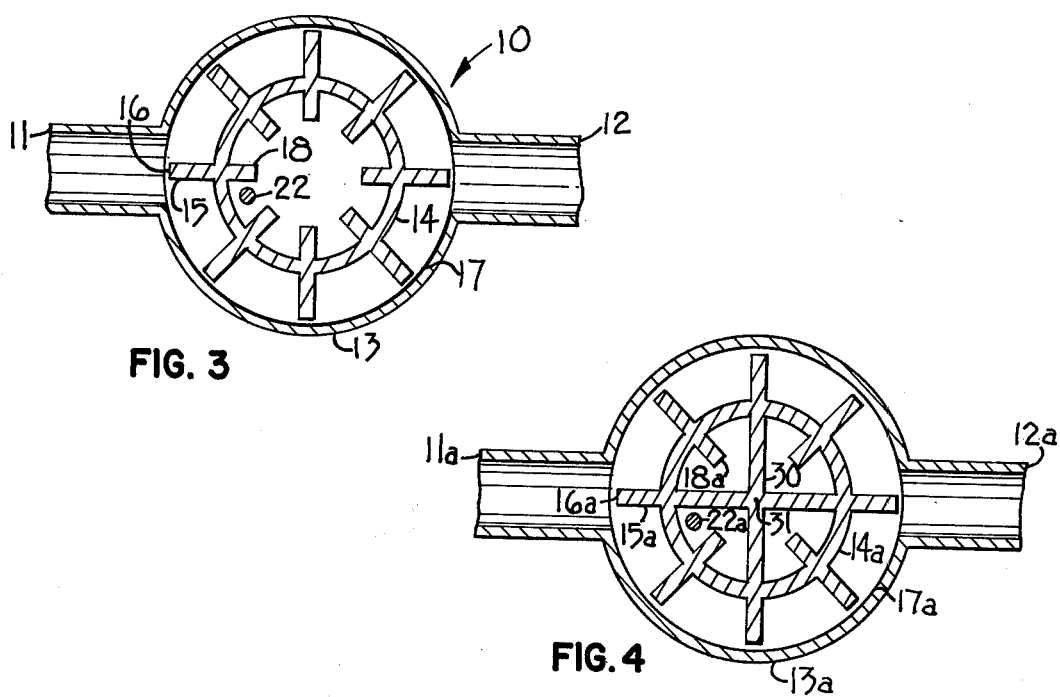

AUTOMATIC LIQUID FLOW CONTROL DEVICE

BACKGROUND OF THE INVENTION

The present invention relates generally to control valves or devices used to start or stop the flow of liquids and more particularly to timed control valves.

Automatic control valves are known which stop the flow of liquid after a predetermined amount of liquid has been delivered. For example, such valves are designed to permit filling of tanks with liquids and to automatically shut off after a certain number of gallons have been delivered. These valves avoid the necessity of having someone present to visually observe the filling of the tank and manually turn the flow off thereby preventing overflowing.

Flow control valves designed to automatically shut off the flow of a liquid after a predetermined period of time are also known in the art. See, for example, U.S. Pat. No. 2,769,574, issued Nov. 6, 1956. The known valves are relatively complicated in structure and have many moving parts. Such complex valves may tend to malfunction and not stop the liquid flow as desired.

It is common knowledge that many resources which have heretofore been considered plentiful are actually limited in availability and should be conserved to the extent possible. Water is one of these limited resources. Recent water shortages in various areas of the United States have led to major efforts to conserve water. In many parts of the United States it is no longer possible to use as much water as one might like. For example, many communities permit watering of one's lawn or garden only during certain periods of time. Excess watering is considered wasteful and no longer allowed in some localities. In addition, only non-peak time (e.g. nighttime) watering is allowed in some localities.

SUMMARY OF THE INVENTION

The present invention provides an automatic liquid flow control device or valve which may be used in conjunction with a liquid supply line to stop or start, or start and later stop the flow of liquid. The automatic liquid flow control valve includes a waterwheel and a timer which can be set to start or stop the waterwheel at a predetermined time. The waterwheel is located within a liquid-tight valve housing. The valve housing includes an inlet and an outlet. Both the inlet and the outlet may comprise coupling means for mounting the valve in a liquid supply line, such as between two sections of garden hose. The waterwheel, when held in a stationary position, prevents liquid from passing through the housing. When the waterwheel is allowed to rotate liquid will freely flow through the housing.

The present invention has several advantages over the many prior art valves or devices designed to perform similar functions. The present invention is inexpensive and simple in construction. The present valve comprises few parts thereby decreasing the possibility of a malfunction.

The present invention is specifically designed to be used as part of a system for watering gardens, lawns or fields. The device of this invention allows lawns or gardens to be watered or fields to be irrigated at night with the flow of water being started or stopped or, alternatively, started and then stopped at a predetermined time or times. Watering during nighttime hours has several advantages over daytime watering. For instance, it is known that watering plants during the day while they are exposed to bright sunlight can actually harm them. Nighttime watering also has the advantage of minimizing evaporation, thus conserving water, since a greater percentage of the water used is available for absorption by the plants being watered. In addition, watering at night has the advantage of using both water and electricity to pump the water during non-peak hours, when usage is at a minimum. Usage during non-peak times puts less strain on water and electric systems and reduces breakdowns.

While the invention will be disclosed with respect to a preferred embodiment in a lawn or garden water system, it will be understood that the broader scope of the invention applies to other applications such as irrigation systems as well as handling other liquids such as gasoline, liquid chemicals, etc. While the invention will be described with respect to specific shapes and types of timing devices, waterwheels, and housings, it will be understood that other configurations and devices which operate in the manner disclosed herein fall within the spirit and the intent of the invention.

BRIEF DESCRIPTION OF THE DRAWING

FIG. 1 is a perspective view of one embodiment of a valve constructed according to the principles of this invention;

FIG. 2 is a partial cross-sectional side view of the device of FIG. 1;

FIG. 3 is a top cross-sectional view along Line 3—3 of FIG. 2; and

FIG. 4 is a top cross-sectional view of a second embodiment of a portion of a liquid flow control valve constructed according to the principles of this invention.

DETAILED DESCRIPTION OF A PREFERRED EMBODIMENT

Referring to FIGS. 1-4, wherein like numerals represent like parts throughout the various views, a preferred embodiment of the automatic liquid flow control valve of this invention is generally shown by the numeral 10 in FIGS. 1-3. Water flow control valve 10 includes a water inlet 11 which can be connected to a water supply line (not shown) such as an ordinary garden hose connected to a water faucet. Valve 10 includes a water outlet 12 which can be connected to a sprinkler, to a garden hose or the like. Inlet and outlet 11 and 12, respectively, may comprise standard garden hose connections when control valve 10 is used with a standard garden hose or hoses to water a lawn or a garden. Housing 13 including inlet 11 and outlet 12 can be constructed of metal, plastic, rubber or the like. Housing 13 desirably is relatively rigid.

Located within housing 13 is paddle wheel or waterwheel 14 which can be either free-floating as illustrated in FIG. 3 or can be rotatably mounted to the interior of housing 13 as illustrated in FIG. 4. Waterwheel 14 can be made of metal, plastic, rubber or the like as long as it will maintain a water-tight fit with cylindrical wall 17 of housing 13 in order to prevent water from flowing through valve 10 when waterwheel 14 is held stationary. Waterwheel 14 includes a plurality of radially extending paddles 15, each having a paddle tip 16. When waterwheel 14 is held in a stationary position as illustrated in FIG. 3 and as further described herein, at least two oppositedly-disposed paddle tips 16 are in water-tight contact with cylindrical wall 17 and prevent water from flowing from inlet 11 through housing 13 to outlet 12. Waterwheel 14 includes a plurality of radially inwardly extending stopping bars 18.

Timing device 20, as illustrated in FIGS. 1 and 2, is connected to or associated with housing 13. Timing device 20 may be electrical or mechanical; for most purposes, a simple spring driven mechanical timing device is preferred. Timing device 20 includes time setting lever 21 which allows timing device 20 to be set to operate (extend or retract) stopping pin 22 at a predetermined time. Stopping pin 22 extends from timing device 20 through opening 19 into housing 13. A watertight seal 23 may be provided in opening 19 which prevents water from leaving the interior of housing 13 through opening 19 and entering timing device 20. Timing device 20 may be a conventional timing mechanism designed to reciprocate a lever or pin. Timing device 20 serves to reciprocably drive pin 22. Timing device 20 withdraws pin 22 from housing 13 to the extent necessary to eliminate contact with stopping bars 18 of waterwheel 14. When stopping pin 22 is in its withdrawn position as illustrated in FIG. 2, waterwheel 14 is allowed to rotate within housing 13 in response to a flow of water entering valve 10 through inlet 11 and water is allowed to flow through valve 10. Timing device 20 can also be designed to cause stopping pin 22 to extend from its retracted position into contact with stopping bars 18 of waterwheel 14 thereby preventing waterwheel 14 from rotating and water from flowing through valve 10. As previously indicated, timing device 20 can be set so that the flow of water through valve 10 is stopped at a predetermined time.

Alternatively, timing device 20 may be designed to withdraw stopping pin 22 at a preset time and at a later preset time to reinsert stopping pin 22. In such an embodiment waterwheel 14 would be allowed to rotate and water would be allowed to pass through valve 10 for a predetermined time interval starting at a predetermined time. For example, valve 10 could be used to set a lawn sprinkler to start at 2:00 a.m. and to shut off at 4:00 a.m.

Waterwheel 14 can be held in a non-rotatable, generally stationary, position by moving stopping pin 22 to its extended position as shown in phantom in FIG. 2. Stopping pin 22 would then contact stopping bars 18 as best shown in FIG. 3. While the space between two adjacent stopping bars 18 may allow waterwheel 14 to oscillate slightly when stopping pin 22 is extended, the oscillation will not be sufficient to allow water to flow through valve 10. In order to eliminate or minimize oscillation waterwheel 14 could be designed so that it would rotate in only one direction. Paddles 15 may be angled slightly from the radial axis in one direction so that waterwheel 14 can only rotate within housing 13 in one direction. The contact between paddle tips 16 and cylindrical wall means 17 would prevent rotation in the direction in which the paddles 15 are angled.

An alternate preferred embodiment 10a of the invention is illustrated in FIG. 4. The structure of valve 10a is substantially like valve 10. Valve 10a comprises housing 13a including inlet 11a and outlet 12a. Housing 13a includes cylindrical wall 17a. Within housing 13a is waterwheel 14a which includes paddles 15a and paddle tips 16a. In the alternate embodiment illustrated in FIG. 4 waterwheel 14a includes rotation guide 30. Rotation guide 30 is mounted on housing 13a at point 31. Rotation guide 30 rotationally attaches waterwheel 14a to housing 13a, thereby assuring that waterwheel 14a rotates in a constant relationship to housing 13a.

In FIG. 4, rotation guide 30 is simply an extension of at least one stopping bar 18a.

While two specific embodiments of the invention have been disclosed, it should be understood that this is for the purpose of illustration only. Other modifications of the invention will be apparent to those skilled in the art in light of the foregoing description. The description is intended to provide specific examples of individual embodiments clearly disclosing the present invention which is to be limited solely by the scope of the appended claims.

What is claimed is:

1. An automatic water flow control valve for installation in a water supply line comprising:
    (a) housing means including cylindrical wall means, inlet means and outlet means;
    (b) paddle wheel means rotatably positioned within said cylindrical wall means, said paddle wheel means having a plurality of generally radially extending paddles, at least two of said paddles contacting the inner surface of said cylindrical wall means in a water-tight fit; said paddle wheel being adapted for rotating in response to a flow of water admitted through said inlet means;
    (c) engagement means adapted for engaging said paddle wheel means to prevent said paddle wheel means from rotating thereby preventing water from flowing through said control valve, said engagement means being adapted for disengaging said paddle wheel means to permit rotation of said paddle wheel means thereby permitting water to flow through said control valve; and
    (d) timing means adapted to operatively drive said engagement means.

2. The automatic water flow control valve as defined in claim 1, further including rotation guide means integral with said paddle wheel means and rotatably associated with said housing means, said rotation guide means allowing said paddle wheel means to rotate within said housing means.

3. An automatic water flow control valve as defined in claim 1, wherein said inlet means and said outlet means are approximately oppositely-disposed.

4. An automatic water flow control valve as defined in claim 1, wherein said timing device is a mechanical timing device and said mechanical timing device can be set to drive said engagement means into engagement with said paddle wheel means at a predetermined time thereby preventing water from flowing through said control device.

5. An automatic water flow control valve as defined in claim 1, wherein said timing device is a mechanical timing device and said mechanical timing device is adapted to be set to disengage said engagement means from said paddle wheel means after a predetermined time interval and to permit said paddle wheel means to rotate in response to a flow of water admitted through said inlet means.

6. An automatic liquid flow control valve for installation in a liquid supply line comprising:
    (a) housing means including cylindrical wall means, inlet means and outlet means;
    (b) paddle wheel means rotatably positioned within said cylindrical wall means, said paddle wheel means having a plurality of generally radially extending paddles, at least two of said paddles contacting the inner surface of said cylindrical wall means in a liquid-tight fit; said paddle wheel being adapted for rotating in response to a flow of liquid admitted through said inlet means;

(c) engagement means adapted for engaging said paddle wheel means to prevent said paddle wheel means from rotating thereby preventing liquid from flowing through said control valve, said engagement means being adapted for disengaging said paddle wheel means to permit rotation of said paddle wheel means thereby permitting liquid to flow through said control valve; and (d) timing means adapted to operatively drive said engagement means.

* * * * *